United States Patent Office 3,173,633
Patented Mar. 16, 1965

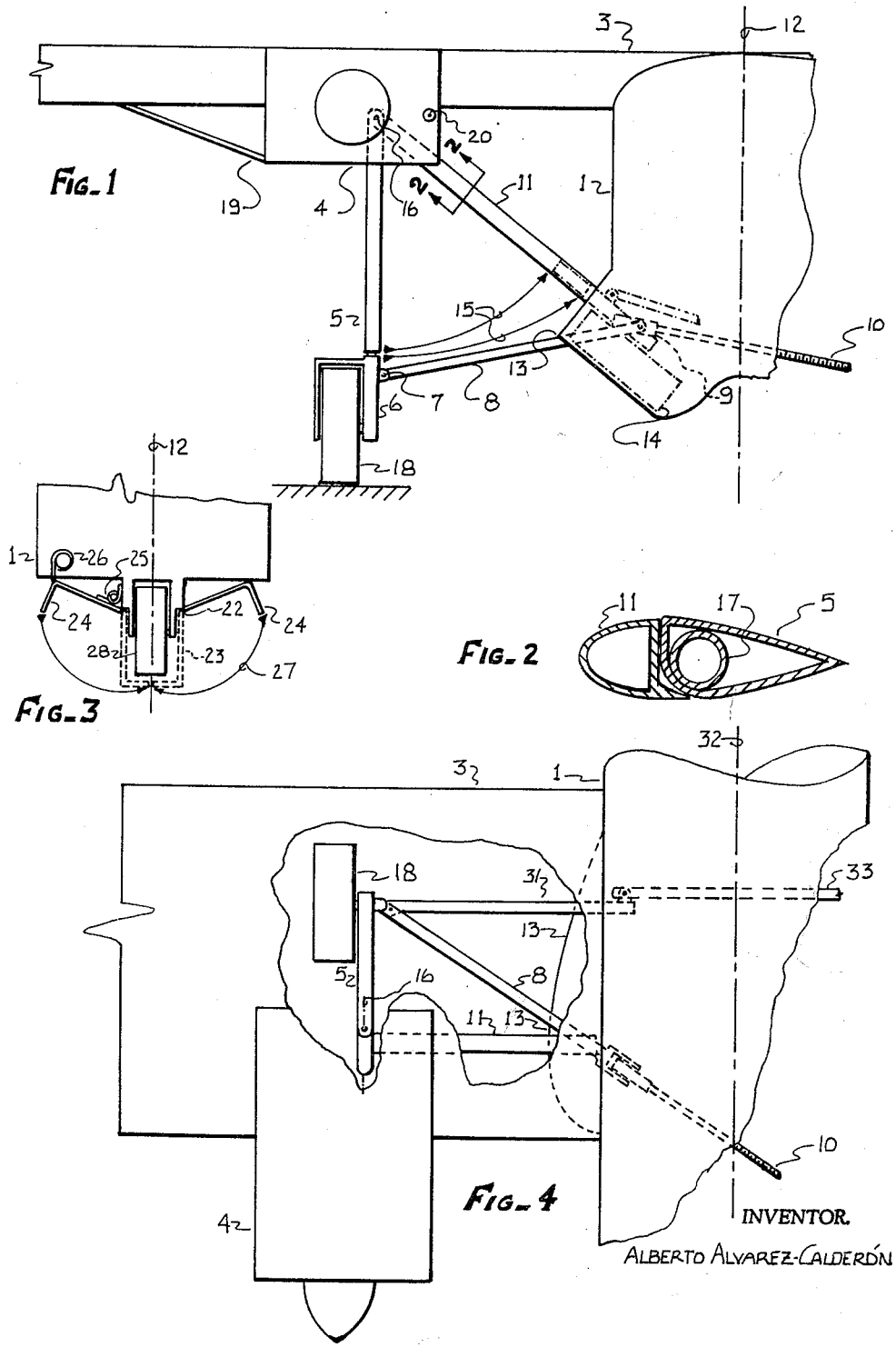

3,173,633
RETRACTABLE LANDING GEAR SYSTEM
Alberto Alvarez-Calderon, 1560 Castilleja St.,
Palo Alto, Calif.
Filed June 15, 1962, Ser. No. 202,890
11 Claims. (Cl. 244—102)

This invention is related to retractable landing gear for aircraft. More specifically, it concerns retractable wheel systems particularly applicable to shoulder and high wing monoplanes.

It is well known that retractable landing gear in aircraft permits a higher cruising speed because of the reduction of airplane drag that results from hiding away the landing gear from the surrounding air stream. For various structural considerations the use of retractable landing gears is easier to justify in an aircraft which has a low wing configuration because if the gears are placed in the wings the length of the struts is obviously shorter and the wheels themselves can be easily stored within the wings. For this reason a great majority of the high speed aircraft are seen to have low wing configurations with various forms of retracting gears. The high and shoulder wing configurations offer some advantages over the low wing configurations for certain purposes, for example, for VSTOL aircraft in which it is desired to minimize adverse aerodynamic ground effect on the flow about the wings at high lift, for visibility purposes in particular in observation aircraft, for "bush" aircraft operating out of rough airfields and for lighter aircraft which use externally braced wings. For these types of high wing aircraft, it is difficult to provide an aerodynamically-structurally efficient retractable landing gear because if the gear is mounted on the fuselage then its retraction into the fuselage results in difficulties of volume storage capacity of the fuselage and in complex retracting mechanisms, and if it is placed on the wings, the gear struts are extremely long and heavy and difficult to stow away. Because of these difficulties we see that most high wing airplanes have fixed landing gears and even in some cases, special fixed gear on the fuselage mounted at streamlined gear pods adjacent to the fuselage which result in a narrow track and therefore poor ground stability.

From an examination of the above mentioned problems, it is evident that a new type of retractable landing gear is desired. Before proceeding with a description of the gear which is the subject of my invention, I shall briefly review some of the design considerations that have influenced my new gear.

From the aerodynamic viewpoint, the purpose of a retractable landing gear is to decrease airplane drag in cruising flight. The drag of a gear system generally has two components: first, we have the drag of the wheel strut which can be made very small if the strut is of a streamlined shape such as to have attached air flow to its surface because in that case the drag contribution depends on the surface area of the strut which evidently is very small compared to the surface area of the aircraft; a second component of the gear drag is the air drag due to the wheel itself with its wheel brake and shock absorbing installation. The wheel drag can be enormous because the wheel is a blunt body with separated flow which acts almost as a flat plate. Designers in the past have seen fit to retract both the gear strut and the wheel and indeed for low wing aircraft, this is a logical choice. However, for a high wing aircraft, as I will show later, a logical choice is to reduce only the wheel leaving the gear strut exposed to the air stream. It is interesting to note that a high speed high wing monoplane in production today—the Cessna 190—has a fully retractable landing gear in the fuselage but uses nevertheless an exposed wing bracing strut, indicating that a strut drag is no great penalty for high speed airplanes if the wheels themselves are retracted.

From the structural viewpoint, the landing gear is required to support the landing loads in a vertical direction, in a side direction and in a drag direction, and the position of the gear system itself establishes an internal load distribution on the aircraft related to the mass distribution in relation to the position of the wheels. Evidently for a high wing monoplane using wing mounted gear struts, the large vertical dimensions required from the gear strut produce large torsional loads at the wing due to side and drag loads since these loads have a large moment arm with respect to the gear attachment in the wing. This indicates the convenience of having a braced gear system which is not cantilevered. In addition, if the high wing monoplane is a multi-engine configuration, it is convenient to take advantage of the mass distribution of the engines to transmit their inertia loads directly from the engines to the ground through the landing gear strut and bypassing the fuselage as this unloads the fuselage from combination loads due to engine inertia forces. Another important structural consideration is that present for VSTOL aircraft of high wing configurations which have to support extremely large landing loads because of their high rate of sink and due to operations from unprepared rough fields. These STOL aircraft in addition are usually required to have a very large volume capacity inside the fuselage which presents additional problems for the case of retracting gears placed within the fuselage.

A consideration of the problems and requirements of high wing monoplanes with retractable landing gear together with the application of the basic aerodynamic and structural design principles noted hereinbefore have resulted in my invention of a new retractable wheel system for high wing aircraft in which a wheel and strut assembly are mounted below the wing with a vertical strut which may be tied at its lower end by a side strut to the fuselage. To retract the wheel, the side strut pulls the wheel into a fuselage fairing adjacent to the lower portion of the fuselage leaving exposed the main gear strut which is now extending between the fuselage and the wing in a manner similar to a wing strut bracing for a high wing monoplane. This arrangement is shown in FIGURE 1. Furthermore, with this arrangement in which only the wheel is retracted, I have combined a braced wing construction with my landing gear such that when the wheel is retracted the main gear strut is positioned in reference to the wing bracing strut one behind the other such as to minimize the air drag of the combination of struts by prescribing a combined air flow cross-section as shown in FIGURE 2.

It is an objective of my invention to provide structure for a retractable wheel system for high and shoulder wing aircraft. Another objective of my invention is to provide a retractable wheel structure for an externally braced high wing aircraft in which the gear strut and the wing strut cooperate to form a low drag strut for cruising flight. Yet another objective of the invention is to provide structure for the application of the system mentioned in the previous paragraph to a twin-engine aircraft in order to accomplish a structurally efficient inertia load distribution and side and drag load distribution during landing. Yet one more objective of this invention is to provide a retractable wheel system for high wing aircraft of the type described which is very stable on the ground by virtue of a wide track. Yet another objective of the invention is to provide a tricycle wheel arrangement in which the complementary nose wheel is fixed and has retractable wheel fairings which expose the wheel for landing only but fully cover it for cruising flight. Yet one more objective of the invention is to provide in the high wing externally braced monoplane of the type described auxiliary wing strut system extending outward from the main wing strut. These as well as other objectives and features of the invention will become more apparent from a perusal of the following description of the various embodiments illustrated in the accompanying drawings wherein:

FIGURE 1 is a partial front elevation of the high wing monoplane incorporating my retractable wheel system in which the wing strut and the wheel strut are combined into a low drag unit for cruising flight.

FIGURE 2 shows the cross-sectional cut 2—2 of FIGURE 1. FIGURE 2 therefore shows the combined cross-sectional shape of the wing strut and the gear strut one behind the other in a streamlined combination.

FIGURE 3 shows a partial front elevation of the complementary fixed nose wheel for the fuselage of an aircraft of the type of FIGURE 1 exhibiting the retractable wheel fairings which provide low drag for the fixed wheel.

FIGURE 4 shows a top view of a modification of the gear system shown in the aircraft of FIGURE 1 indicating some details of wheel strut bracing and retraction mechanisms. With initial reference to FIGURE 1, I show a partial front elevation of a high wing monoplane incorporating the retractable wheel system which is the subject of my invention. Specifically I show a central body portion or fuselage 1 having a vertical plane of symmetry 12 adjacent to the upper surface of the fuselage there is shown mounted in a high wing position a wing 3. I will now proceed to describe the basic structure of the invention. On wing 3 outboard from the fuselage 1, there is mounted at pivotal axis 16 a vertical wheel strut 5 which supports at its lower end a lower wheel strut portion 6 and a wheel 18. Lower strut portion 6 is mounted on wheel strut 5 by means of conventional shock absorbing devices. The wheel strut is shown connected to fuselage 1 by means of side strut 8 which in this example is connected to the gear strut at portion 6 and to the fuselage by means of a threaded axial rotatable rod 10 mounted on the fuselage. In order to retract wheel 18 to fuselage 1 rod 10 is made to rotate by any means (for instance, a hand crank or an electric motor) whereby threaded carriage 9 slides inward on rod 10 pulling side strut 8 towards the fuselage and thereby bringing strut 5 and its associated wheel 18 to a final position shown in dash dot lines within the fuselage and in which wheel appears in position 14. It should be observed that the retractable wheel system described so far is also advantageous and useful without side strut 8 especially if it is desired to avoid using rod 10 on the fuselage in order to increase its volume storage capacity: the side loads and door retraction mechanism can be taken care of in the wing and nacelle as is usual with conventional gears which rotate in a spanwise plane inwards towards the wings (for instance that of the Republic P–47 fighter or that shown in FIGURE 10:15.1 "Simple manual retraction gear for light airplane" in page 10:5 of Airplane Design, by K. D. Wood).

The structure described so far has been shown to apply to a high wing monoplane with a wing-mounted landing gear system comprising a wheel with a strut. It has been shown that the wheel can be faired completely within the fuselage in this case by providing a fuselage bulge 13 to house the wheel without disturbing the volume storage capacity of fuselage 1. Evidently, however, wheel 18 could be placed on the right side of strut 6 if desired, in that case it is obvious by inspection that in the wheel retracted positon no extra fuselage bulge would be required to house the retracted wheel within the conventional fuselage cross-sectional shape. In the system described so far in this figure, the cross-sectional shape of strut 5 should be airfoil shaped such that in the retracted wheel position the drag of the strut will be only that due to surface skin drag. Therefore the shape of strut 5 should preferably be in that case that of a 25 percent thick symmetrical airfoil such as the NACA 0025. It is interesting to note that during retraction of the wheel strut the distance between the wheel 18 and fixed pivot axis 16 increases due to the extension of the shock absorbing mechanism which occurs when the ground loads disappear. This extension is shown by the divergence of the two arrows 15 which sketch the relative displacement of the adjacent ends of gear strut 5 and 6 when the gear is unloaded.

I will now describe, also in connection with FIGURE 1, an improved arrangement of my landing gear structure previously described in connection with this figure. Whereas in the previous paragraphs no specification was made of the type of wing structure incorporated in the aircraft, that is to say the aircraft could have been a cantilevered wing monoplane, in the application I now will specify, the wing structure of the aircraft should be that of an externally braced monoplane having wing strut 11 extending between the lower portion of fuselage 1 to a wing position adjacent to pivot axis 16. This is shown in the figure by means of wing strut 11 which is placed in fact such that the position of the gear strut 5 in the retracted gear condition in relation to strut 11 is such that one srut is behind the other defining a combination strut cross-section which produces unique aerodynamic cooperation. This is illustrated by means of cross-sectional cut 2—2 in FIGURE 1 which is shown in greater clarity in FIGURE 2. Before describing FIG. 2 note that cross-shape of strut 5 may be shaped and oriented to produce an inboard aerodynamic force which would be invaluable for aid in manual retraction of my gear. FIGURE 2 therefore shows the cross-sectional shape in a plane perpendicular to the long dimension of the strut having an airfoil shape defined by a leading edge fixed wing strut 11 and a trailing edge consisting of a landing gear strut 5 having within itself a main tubular gear member 17. The combined shapes of portion 11 and 5 define a symmetrical airfoil of about 30 percent thickness. It should be observed that it is also possible to make the forward portion of the combined airfoil correspond to the pivoted gear strut and the rear portion of the combined airfoil correspond to the fixed wing strut. It is understood clearly that cross-sectional shape of FIGURE 2 exists only in the cruise condition; in the landing condition, of course, the rear portion 5 corresponding to the wheel strut would be displaced away from the fixed strut portion 11. It should be observed that as shown in FIGURE 2 the total combined cross-sectional area is divided into two main cross-sectional areas defined by tube 11 and tube 5. The cross-sectional areas of tubes 5 and 11 should be of the same order of magnitude and the cross area of tube 5 may be made somewhat larger than that of tube 11 because tube 5 has to resist landing loads which may be greater than the loads applied to tube 11. Also it should be observed that the division of cross area between the two tubes occurs at a chordwise location in the combined shape approximately equal to the chordwise location of the maximum thickness of the combined cross-sectional shape.

Returning now to FIGURE 1, I should like to point out certain advantages of the gear structure system and the braced wing structure. It is evident by inspection that the side loads on wheel 18 are taken principally by side structure 8 thereby releasing the wing itself from any couples in the spanwise plane due to gear side loads. Furthermore, the vertical loads which manifest themselves due to vertical inertia forces in the fuselage and in vertical landing loads on the wheels are distributed by an internal load system which appear in a highly efficient determinate truss comprising cross members 5, 8, 11, the fuselage, and the inboard portion of the wing from pivot axis 16 to the fuselage. In this structure evidently wing diagonal 11 is acting in tension which is a favorable structural condition.

One more detail of importance of FIGURE 1 is the application of the gear structure to the case of a multi-engine aircraft having an even number of power plants disposed in substantial symmetry to the fuselage. As shown in the figure, there is an engine with an engine nacelle 4 located approximately directly above the wheel. In this case evidently the vertical inertia loads due to the engine weight are transmitted directly to the ground through wheel strut 5 without going through the fuselage. This permits an extremely light fuselage and what is more the gear system is particularly well adapted for modifications of existing aircraft in which new or heavier engines are placed on the wing because by this direct transmission of the loads due to the new weights which can go directly to the ground through the gear, a serious modification of the fuselage structure is avoided.

One additional detail of interest in FIGURE 1 is the use of an auxiliary wing strut brace between an engine nacelle protruding below the lower surface of the wing and a wing location outboard from the position of the nacelle. Specifically in the figure I show an underslung nacelle 4 with an outboard edge from which there extends an auxiliary wing strut 19 bracing the wing to an outboard position which is typical of the tie-in position of the conventional struts of braced wing monoplane. By examining the truss system formed by fuselage 1, wing 3, wing strut 11, fuselage nacelle 4, and auxiliary wing strut 19, it is evident that the binding couples in a spanwise plane can be transmitted very efficiently thereby resulting in a lighter wing structure.

Other items of interest in FIGURE 1 are: location of an alternate gear strut pivot axis 20 inboard from pivot axis 16 shown for strut 5; the cross-sectional shape of bulge 13 in the fuselage and the position of strut 11 with respect to 13 which evidently makes the system well suited for seaplanes as it permits an efficient use of the hull volume to retract an efficient landing gear system, the strut of which is away from the hull's lateral lower edge; and finally, the location of the ground in reference to wheel 18, the lower portion of fuselage 1 and nacelle 4. This last consideration brings me to the question of the third wheel of the landing gear system. In the case of a tail wheel system evidently standard tail wheel designs can be used as are known to those skilled in the art; in the case of a nose wheel design, special advantages can be taken from the overall configuration to further decrease the overall gear drag; for an aircraft of the type shown in FIGURE 1, namely, a high wing monoplane, with my retractable gear system there evidently are no problems of propeller clearance and, in fact, the landing gear height is determined by fuselage ground clearance considerations. Therefore the fuselage can be made quite close to the ground especially for aircraft designed to operate out of paved airports, and the gear size at the nose in a vertical direction can be made quite small and of the order of say one foot or a wheel diameter. For such a small nose gear system, it has been customary in the past to retract the gear (for instance, the Aero Commander twin-engine airplane). Actually, however, it is known that even a nose wheel is costly and involves maintenance problems which are not present in fixed nose wheels. A careful examination of the structural and aerodynamic problems presented by a small nose wheel, however, indicates that the logical solution is not to retract the gear but to utilize a fixed nose wheel having retractable wheel fairings which may be clam shell doors. The advantage is that instead of retracting a structural member which has to take heavy loads and which has to be steerable, there is retracted a pair of light-weight doors subject only to small air forces. Yet if properly designed, this fixed nose wheel gear with retractable fairings will be substantially lighter, simpler, cheaper and almost as low drag an installation as a retractable nose wheel. This complementary nose wheel structure is shown in FIGURE 3. Specifically I show a partial front elevation of an aircraft of the type shown in FIGURE 1 modified to incorporate this nose wheel and having a central plane of symmetry 12 and a lower forward fuselage end 1 supporting a fixed nose wheel 28 which may be a steerable nose wheel but is not retractable with respect to fuselage 1. In order to provide a low drag cruise gear configuration there are provided a pair of doors 24 which are pivoted at generally horizontal axis 22 to a wheel stub fairing. The doors in position 24 are exhibited in the landing position with a major portion of wheel 28 exposed and with the doors themselves being located above the exposed portion of the wheel. To move doors 24 to high speed condition, they are rotated about axis 22 downwards along arc 27 to final position 23 in which the wheel is completely housed within the surfaces of the doors. The door can be closed by any mechanisms used to close panels in aircraft such as flap panels, etc. In FIGURE 3, by way of example, there is shown a spring 25 which is useful to close downwards doors 24 and a cable system 26 which is useful to open doors 24. This spring and cable system has been shown external to the doors but obviously it can be made internal to the closed door position. In order to provide low drag at cruise speed, the surface of door 24 should form a substantially smooth and uninterrupted envelope around wheel 28, with said envelope having a cross-sectional shape in a horizontal plane being that of a streamline body or an airfoil. The envelope or wheel fairing should be preferably of length approximately greater than its depth, and from a side view it should preferably exhibit a parellelogram shape which is swept back or swept forward with respect to a horizontal plane in the fuselage.

The incorporation of the nose wheel system of FIGURE 3 in an aircraft exhibiting the combined wing and gear strut arrangement shown in reference to FIGURES 2 and 1 offers a new, unique, practical, inexpensive, lightweight, and peculiar solution for the landing gear problems and high speed considerations of a multi-engine high wing monoplane with a tricycle gear system.

I shall now consider other problems related to the use of a combined wing strut and landing gear strut as proposed in FIGURES 1 and 2 and in relation to a tricycle gear installation. As is known, in a tricycle gear system using a nose wheel, the main gears are located behind the center of gravity of the aircraft. Yet it is customary to locate wing struts at about the quarter chord wing location which is usually ahead of the landing gear location. It is therefore evident that there may be some problems in placing the gear strut immediately adjacent to a conventionally located wing strut in such a tricycle gear system. The solutions that exist are many, for instance: the wing strut may be moved rearwardly to coincide with the optimum gear strut location or two wing struts may be used, one to the quarter chord of the wing in conventional fashion, and one in a rear spar location coincident with the support of the gear strut. This double wing strut arrangement in which the rear wing strut acts in combination with the gear strut offers the advantage that the couples in a vertical plane due to drag loads on the wheels can be distributed into the fuselage with the aid of two wing struts. A third arrangement is shown in FIGURE 4: in that figure, there is shown in a partial top view the gear system of FIGURE 1 exhibiting certain modifications which permit the use of a conventional wing strut location together with my combination gear and wing strut but yet permitting a tricycle gear arrangement. For this purpose as shown in FIGURE 4, pivot axis 16 of gear strut 5 is located at the wing in a chordwise direction at a negative incidence angle with respect to the wing such that when the wheel strut is retracted (a position not shown), the wheel strut is adjacent to wing strut 11 which is located adjacent to the quarter chord of the wing; yet by virtue of the negative incidence of hinge line 16 when strut 5 is pivoted outward from the fuselage to the position shown in FIGURE 4, evidently the wheel 18 is displaced rearwardly as well as outwardly thereby falling to the rear of the center of gravity of the aircraft and permitting the use of a tricycle wheel system.

Additional feature of interest shown in FIGURE 4 is the use of a V-brace between the wheel strut and the fuselage to take care of side and drag landing loads as well as to accomplish retraction of the wheel into the fuselage. In that respect, there is shown lateral drag strut 8 and side load strut 31 which move with respect to threaded rod 10 and sliding rail 33 respectively under the rotation of rod 10. It is of interest to note that in FIGURE 4 there is shown a top view of gear fairing 13 which is seen to consist of a streamlined bulge of very small dimensions on the lower side of the fuselage.

I have now completed a description of the figures shown in the accompanying drawings; now I shall show some calculations indicating the aerodynamic advantages of my retractable wheel system for high and shoulder wing aircraft having cantilever wings. For this purpose, I made calculations concerning the air drag of a streamlined gear strut without a wheel (such as that present in cruise flight for cantilevered wing aircraft utilizing my invention) to the air drag of a streamlined gear strut using wheel exposed to the air stream (such as the air drag present in fixed gear aircraft):

Let the gear strut be a 25% thick airfoil-shaped strut of high aspect ratio. Its section drag coefficient, based on planform area, is approximately .012 (see NACA TR824). The drag coefficient of the wheel, wheel-brake and shock absorber may be approximated by a flat plate perpendicular to the wind direction having an area about equal to the frontal area of the wheel alone. The drag coefficient for such a body, based on the frontal plate area, is about 1.2 (see FIGURE 11.1, "Principles of Aerodynamics," by Dwinell). For a strut and wheel installation of the type shown in FIGURE 1 in a cantilever aircraft, we compute drag ratio of exposed strut in wheel-retracted position to that of exposed strut and wheel. A scale of 1 inch=2 feet is assumed by way of example. The drag force on the wheels alone is equal to $[(1.2)\ (2\times0.6)q]=1.44q$ lbs. where $(2\times0.6)$ is the frontal area for wheel in square feet, $q$ is dynamic pressure in lbs. per square foot, and 1.2 is the assumed wheel drag coefficient. The drag per exposed strut is equal to:

$$(0.012)\ (0.25\times4\times3.5)q=.042q \text{ lbs.}$$

where 0.012 is section drag coefficient based on planform area, 0.25 is frontal thickness of strut, 4 is a factor to convert area from frontal to planform, 3.5 is length in feet of exposed strut with wheel retracted, and $q$ is dynamic pressure in lbs. per square feet.

The ratio of sum of strut and wheel drag to strut drag is $$\frac{(0.042+1.44)q}{0.042q}=35.3$$

indicating that a very large reduction of drag is possible in a cantilever wing aircraft by retracting the wheel leaving a streamlined gear strut exposed to the airstream.

We now compare the drag of my landing gear system installed on a high wing aircraft having externally braced wings and in which the gear strut and the wing strut are located as described in connection with FIGURES 2 and 1 of my invention: evidently the wheel drag itself disappears by wheel retraction. Furthermore, the wheel strut drag becomes negligible because the wheel strut is combined with the fixed wing strut which is present anyway as a member of the wing structure. Therefore for the gear installation which is the subject of this paragraph we consider that the reduction in drag due to my system is virtually the same as that reduction present in retractable gear systems which retract both the wheel and the wheel strut. Various further modifications and alterations from those described hereinabove can obviously be made without departing from the spirit of this invention. For example, in the structure of FIGURE 1 by a small re-arrangement of the proportions, the strut 5 can be made to carry a stabilizing float for lateral static stability of a seaplane in the water, which float can be retracted to a position adjacent to the fuselage and faired with the fuselage. Alternately instead of having a side strut 8 of conventional cross-sectional shape, it can be constructed having a high lift section and with boundary layer control or other power means for high lift installed in the strut; another use for strut 8 is that of housing a channel for the discharge of agricultural substances for crop dusting aircraft. Also, in FIGURE 1, it is possible to mount axially rotating shaft 10 in a vertical position or in a fore-and-aft position in the fuselage; the nacelle shown in wing 3 could also be mounted on top of the wing in which case auxiliary external wing brace 19 would be positioned on top of the wing. In a different arrangement of FIGURE 1, strut 8 is pivoted to the lower fuselage portion, and the wheel is retracted into nacelle or wing by upward angular motion of strut 5 to a final position in which strut 5 is external to and between the wing and fuselage.

The foregoing are to be considered purely as exemplary applications of the invention. The actual scope of the invention is to be indicated by reference to the appended claims.

I claim:

1. A high wing monoplane aircraft having a fuselage with a pair of externally-braced wings extending laterally therefrom and having at least two engines mounted on said wings in substantial symmetry with respect to said fuselage and external wing struts extending from a location on said wings adjacent to said engine to a lower portion of said fuselage; and a landing gear including a pair of strut-and-wheel structures with each of said strut-and-wheel structures being pivotally mounted on said wings at a substantially chordwise pivotal axis adjacent to said engines and adjacent to the upper end of said external wing struts; and means provided to move said strut and wheel structures between a landing position in which said wheel-and-strut structures are approximately below said engines, and a retracted position in which said wheels are adapted to be faired in the lower portion of said fuselage and said struts of said gear structure are positioned substantially immediately adjacent and parallel to said wing struts with said wing strut and gear strut on each side of said fuselage being located one behind the other.

2. The aircraft of claim 1 further characterized in that the combined cross-section of said wing strut and gear strut on each side of said fuselage in a plane perpendicular to the long dimension of said struts is an airfoil-shaped cross-section.

3. The structure of claim 2 further characterized in that said means to move each of said strut and wheel structures includes a lateral strut between said gear strut and said fuselage, said lateral strut being connected to a threaded axially rotatable shaft fixedly mounted on said fuselage which moves said lateral strut towards said fuselage for retraction of said gear.

4. The structure of claim 2 further characterized in that the fuselage of said aircraft mounts in its forward portion a fixed wheel having movable doors adjacent to said wheel with said doors having a substantially horizontal axis of motion and means provided to move said doors between a high speed position in which said doors enclose said wheels substantially completely, and a landing position in which a major portion of said wheel is exposed and in which said doors are moved upward above said major portion of said wheel.

5. The structure of claim 1 further characterized in that said aircraft has two engine nacelles protruding from one of the upper and lower surfaces of said wings, and in that an auxiliary external wing strut is mounted between a protruding portion of each of said engine nacelles and a location on said wings outboard of said nacelle.

6. An aircraft having a fuselage with an upper portion and a lower portion; a pair of externally-braced wings having root portions adjacent to said upper portion of said fuselage and extending laterally from said fuselage; external wing struts extending from a position outboard from said root portions of said wings to said lower portion of said fuselage; and a landing gear including a pair of strut-and-wheel structures with the upper end of each of said strut-and-wheel structures being pivotally mounted on said wings at a substantially chordwise pivotal axis located substantially immediately adjacent to the upper end of said external wing struts; said strut-and-wheel structures being movable between a landing position in which said wheel struts are inclined to said wings at an angle greater than the angle between said wing struts and said wings with said wheels located at a lower elevation than the lower portion of said fuselage, and a high-speed position in which said wheels are in said lower portion of said fuselage and said wheel struts are substantially immediately adjacent to said wing struts one faired with the other.

7. An aircraft having wings and a central body portion with an upper surface, side surface portions which are substantially vertical adjacent to said upper surface at the location of the wing's root, and a lower central body surface; and a pair of wings extending outwardly from said central body portion adjacent to said upper surface with said wings having wing roots with a lower wing surface substantially perpendicular and immediately adjacent to said substantially vertical side surfaces; and a pair of landing gear means one mounted on each of said wings on opposite sides of said body portion with each of said gear means having a wheel-strut portion with a streamlined cross-section and a wheel, and means provided to move said landing gear means between a high speed retracted position in which said wheels are adapted to be faired in said body portion adjacent to said lower surface and in which said wheel struts extend from a wing position outward from said wing roots to said lower surface of said body portion; said strut having the majority of its length and area external to said side surfaces and to the lower surface of said wings with said strut being substantially inclined to said side surfaces and exposed to the airstream remote from the intersection of said side surfaces and the lower surfaces of said wing roots, and a landing position in which each of said struts is approximately vertical and each of said wheels is remote from said body portion and at an elevation lower than the elevation of said lower surface of said body portion, said aircraft being further characterized in that said means to move said gear includes a side strut which when said gear is in said landing position extends from said wheel strut at a position adjacent to said wheel to said body portion at a location adjacent to said lower surface, and means provided to move said side strut inwards towards said body portion to retract said wheel, said side strut being substantially completely faired with said central body portion when said wheel is in said retracted position.

8. The aircraft of claim 7 being further characterized in that each of said wheel struts has an upper portion pivotally connected to said wing at a substantially chordwise pivotal axis, shock-absorbing means mounted on said upper strut portion remote from said wings, and a lower wheel strut portion connected to said shock absorbing means, in that said side strut is connected to said lower wheel strut portion and in that the axial length of said wheel strut in said retracted wheel position is greater than the axial length of said wheel strut in said wheel extended position, thereby enabling a position of the hinge axis of said upper strut portion to be substantially outboard from said root portions of said wing.

9. The aircraft of claim 7 further characterized in that each of said wheel strut portions are mounted on one of said wings at a chordwise pivotal axis which is inclined at a negative incidence angle with respect to the wing's chord, and in that each of said wheels in said extended gear position is placed to the rear of the position of said wheels in said retracted position.

10. An aircraft having wings and a central body portion with an upper surface, side surface portions which are substantially vertical adjacent to said upper surface at the location of the wing's root, and a lower central body surface; and a pair of wings extending outwardly from said central body portion adjacent to said upper surface with said wings having wing roots with a lower wing surface substantially perpendicular and immediately adjacent to said substantially vertical side surfaces; and a pair of landing gear means one mounted on each of said wings on opposite sides of said body portion with each of said gear means having a wheel-strut portion with a streamlined cross-section and a wheel, and means provided to move said landing gear means between a high speed retracted position in which said wheels are adapted to be faired in said body portion adjacent to said lower surface and in which said wheel struts extend from a wing position outward from said wing roots to said lower surface of said body portion; said strut having the majority of its length and area external to said side surfaces and to the lower surface of said wings with said strut being substantially inclined to said side surfaces and exposed to the airstream remote from the intersection of said side surfaces and the lower surfaces of said wing roots and a landing position in which each of said struts is approximately vertical and each of said wheels is remote from said body portion and at an elevation lower than the elevation of said lower surface of said body portion, said aircraft being further characterized in that said pair of landing gear means form part of a tricycle landing gear system which comprises said retractable pair and a non-retractable central gear located on said body portion ahead of said gear pair, said non-retractable central gear having a wheel and a movable wheel fairing mounted substantially immediately adjacent to said lower surface of said central body portion, said movable fairing having a door portion movable about a fore-and-aft axis between a high speed position in which said door portion, together with said fairing and with the undersurface of said central body encloses said wheel substantially completely in a streamlined protuberance below and immediately adjacent to said central body, and a landing position in which said door is moved upwards to expose at least a substantial portion of said wheel and in which said door is raised above the exposed portion of said wheel.

11. An aircraft having wings and a central body portion with an upper surface, side surface portions which are substantially vertical adjacent to said upper surface at the location of the wing's root, and a lower central body surface; and a pair of wings extending outwardly from said central body portion adjacent to said upper surface with said wings having wing roots with a lower wing surface substantially perpendicular and immediately adjacent to said substantially vertical side surfaces; and a pair of landing gear means one mounted on each of said wings on opposite sides of said body portion with each of said gear means having a wheel-strut portion with a streamlined cross-section and a wheel, and means provided to move said landing gear means between a high speed retracted position in which said wheels are adapted to be faired in said body portion adjacent to said lower surface and in which said wheel struts extend from a wing position outward from said wing roots to said lower surface of said body portion; said strut having the majority of its length and area external to said side surfaces and to the lower surface of said wings with said strut being substantially inclined to said side surfaces and exposed to the airstream remote from the intersection of said side surfaces and the lower surfaces of said wing roots and a landing position in which each of said struts is approximately vertical and each of said wheels is remote from said body portion and at an elevation lower than the elevation of said lower surface of said body portion, said aircraft being further characterized in that said means to move said gear include wheel-struts having cross-section which are capable of developing aerodynamic lateral forces directed from said struts towards said central body portion and tending to move said wheels upwards towards said body portion.

References Cited by the Examiner

UNITED STATES PATENTS

| | | | |
|---|---|---|---|
| 1,433,729 | 10/22 | Kemp | 244—130 |
| 1,804,312 | 5/31 | Brown | 244—55 |
| 2,122,214 | 6/38 | Reid | 244—102 X |
| 2,361,293 | 10/44 | Jeffries | 244—102 |

FOREIGN PATENTS 746,811   12/44   Germany.

FERGUS S. MIDDLETON, *Primary Examiner.*
MILTON BUCHLER, *Examiner.*